US012520834B2

(12) United States Patent  (10) Patent No.: US 12,520,834 B2
Leclair  (45) Date of Patent: Jan. 13, 2026

(54) FISHING POLE/ROD HOLDING DEVICE

(71) Applicant: Alan Leclair, Arapahoe, WY (US)

(72) Inventor: Alan Leclair, Arapahoe, WY (US)

( * ) Notice: Subject to any disclaimer, the term of this patent is extended or adjusted under 35 U.S.C. 154(b) by 0 days.

(21) Appl. No.: 18/960,274

(22) Filed: Nov. 26, 2024

(65) Prior Publication Data

US 2025/0204508 A1  Jun. 26, 2025

Related U.S. Application Data

(60) Provisional application No. 63/613,200, filed on Dec. 21, 2023.

(51) Int. Cl.
*A01K 97/10* (2006.01)
*A01K 97/01* (2006.01)

(52) U.S. Cl.
CPC .............. *A01K 97/10* (2013.01); *A01K 97/01* (2013.01)

(58) Field of Classification Search
CPC ........ A01K 97/01; A01K 97/10; A01K 97/11; A01K 97/12
USPC ...................................... 43/21.2, 17, 16, 4.5
See application file for complete search history.

(56) References Cited

U.S. PATENT DOCUMENTS

| | | | | |
|---|---|---|---|---|
| 178,012 A * | 5/1876 | Koelsch | ................. | A01K 97/10 248/302 |
| 1,967,427 A * | 7/1934 | Puckett | ................. | A01K 97/10 248/302 |
| 1,992,165 A * | 2/1935 | Bardon | ................. | A01K 97/10 248/515 |
| D157,716 S * | 3/1950 | Wortman | ...................... | 43/21.2 |
| 2,506,824 A * | 5/1950 | Brown | ................. | A01K 97/10 248/291.1 |
| 2,763,453 A | 9/1956 | Palino | | |
| 2,775,838 A | 1/1957 | Miller | | |
| 2,869,814 A | 1/1959 | Hurlimann | | |
| 2,873,850 A * | 2/1959 | Ortegren | ................. | B01L 9/06 422/561 |
| 3,306,560 A * | 2/1967 | Wheeler | ................. | A01K 97/10 248/156 |
| 3,586,274 A * | 6/1971 | Hart | ................. | A01K 97/10 248/314 |
| 3,612,454 A * | 10/1971 | Linn | ................. | A01K 97/10 248/314 |
| D222,964 S * | 2/1972 | Woodbury | ...................... | 43/21.2 |
| 3,856,243 A * | 12/1974 | Ruter | ................. | A01K 97/10 248/314 |
| 3,897,646 A * | 8/1975 | Sheets | ................. | A01K 97/11 43/21.2 |

(Continued)

*Primary Examiner* — Monica L Perry
*Assistant Examiner* — Maria E Graber
(74) *Attorney, Agent, or Firm* — Brennan, Manna & Diamond, LLC

(57) ABSTRACT

A fishing pole/rod holding device is disclosed for holding a fishing pole for an extended period of time while fishing. The device is a mount that holds a fishing pole/rod in a stable and upright position. The fishing pole/rod holding device comprises a spiraled portion, a flat portion, and a stake. Once the stake is inserted into the ground or ice and the flat portion is hooked onto it, a fishing pole can be inserted into the spiraled portion. Thus, the fishing pole is secured in an upright position and can remain as such (i.e., hands free) for an extended period of time, improving the overall fishing experience.

14 Claims, 3 Drawing Sheets

(56) References Cited

U.S. PATENT DOCUMENTS

| | | | | |
|---|---|---|---|---|
| 4,012,861 A * | 3/1977 | Gellatly | A01K 97/11 43/15 |
| 4,656,774 A * | 4/1987 | Terrill | A01K 97/10 248/545 |
| 4,669,214 A * | 6/1987 | Behrle | A01K 97/10 43/21.2 |
| 4,739,575 A * | 4/1988 | Behrle | A01K 97/10 248/538 |
| 4,746,253 A * | 5/1988 | Simmons | A01K 97/12 43/25 |
| 4,877,165 A * | 10/1989 | Behrle | A01K 97/10 224/558 |
| 4,896,854 A * | 1/1990 | St. Laurent | F41B 5/14 248/156 |
| D416,071 S * | 11/1999 | Sizer | A01K 97/10 D19/84 |
| D416,976 S * | 11/1999 | Sizer | D22/147 |
| 5,987,804 A * | 11/1999 | Shearer | A01K 97/10 43/21.2 |
| 6,185,855 B1 * | 2/2001 | Sizer | A01K 97/01 43/21.2 |
| 6,487,813 B2 * | 12/2002 | Baynard | A01K 97/10 248/538 |
| 7,418,798 B2 * | 9/2008 | Barrett | A01K 97/10 43/21.2 |
| 8,033,046 B2 * | 10/2011 | Morehead | A01K 97/10 43/21.2 |
| 8,381,428 B2 * | 2/2013 | Barnes | A01K 97/10 248/530 |
| D703,369 S * | 4/2014 | Jones | D26/114 |
| 9,137,978 B1 | 9/2015 | Sullivan | |
| D742,592 S * | 11/2015 | Petruccelli | D28/73 |
| 9,314,009 B2 * | 4/2016 | Shaw, Jr. | A01K 97/10 |
| 9,968,079 B2 * | 5/2018 | Bricko | A01K 97/10 |
| 10,104,878 B2 * | 10/2018 | Brooks | A01M 31/00 |
| D886,234 S * | 6/2020 | Lavoie | D22/147 |
| 11,596,136 B2 * | 3/2023 | Kurz, II | A01K 97/10 |
| 12,336,522 B2 * | 6/2025 | Kurz, II | A01K 97/10 |
| 2006/0213109 A1 * | 9/2006 | Zunker | A45B 3/00 43/21.2 |
| 2009/0241406 A1 * | 10/2009 | Foss | A01K 97/01 43/21.2 |
| 2010/0193660 A1 * | 8/2010 | Colla | A01K 97/01 248/552 |
| 2014/0352196 A1 | 12/2014 | Copeland | |
| 2016/0120161 A1 * | 5/2016 | Aiello | A01K 97/11 43/16 |
| 2017/0119134 A1 * | 5/2017 | Dabbs | A45B 11/00 |

* cited by examiner

FISHING POLE/ROD HOLDING DEVICE

CROSS-REFERENCE TO RELATED APPLICATION

The present application claims priority to, and the benefit of, U.S. Provisional Application No. 63/613,200, which was filed on Dec. 21, 2023, and is incorporated herein by reference in its entirety.

FIELD OF THE INVENTION

The present invention relates generally to the field of fishing pole holding devices. More specifically, the present invention relates to an ice fishing pole holder that is designed specifically for ice fishing purposes. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in fishing pole holding devices. Generally, those who ice fish may need to set down their pole and take a break or perform other tasks. While the pole is unsecured or not under constant supervision, it may be pulled into the hole in the ice and permanently lost. Additionally, holding an ice fishing pole for extended periods of time can be very frustrating, especially if fish are not biting. Still further, an individual may want to attend to (i.e., 'man') multiple fishing poles simultaneously.

As is known, ice fishing does not only require specific equipment but presents unique challenges and risks as opposed to traditional fishing. One common risk is losing a pole if it is unattended and pulled down through the ice hole. This being said, many traditional fishing pole holders are lacking in an effective retention means and are not effective in ice fishing settings. This leads to many ice fishermen and fisherwomen having to constantly hold their poles, which can be tiring and lead to frustration if fish aren't biting. Additionally, constantly holding the fishing pole does not allow for users to take a break and eat or relieve themselves unless they reel in the line and potentially miss a catchable fish. In addition, having to maintain a hold on one pole prohibits the fisherman from utilizing other poles.

Accordingly, there is a demand for an improved fishing pole holding device that is specifically designed for ice fishing purposes. More particularly, there is a demand for an ice fishing pole/rod holding device that secures ice fishing poles in an upright position for extended periods of time. Further, there is a demand for a device that enables a fisherman to utilize or 'man' more than one pole.

Therefore, there exists a long-felt need in the art for an ice fishing pole/rod holding device that provides users the ability to secure their pole after casting in order to take a break or perform other tasks. There is also a long-felt need in the art for an ice fishing pole/rod holding device that prevents the pulling of a pole under the ice while fishing. Finally, there is a long-felt need in the art for a fishing pole holding device that is effective in ice fishing settings.

The subject matter disclosed and claimed herein, in one embodiment thereof, comprises an ice fishing pole/rod holding device. The device is a mount that holds an ice fishing pole in a stable and upright position. The ice fishing pole/rod holding device comprises a spiraled portion, a flat portion, and a stake. Once the stake is inserted into the ice and the flat portion is hooked onto it, a fishing pole can be inserted into the spiraled portion. Thus, the fishing pole is secured in an upright position and can remain as such (i.e., hands free) for an extended period of time, improving the overall ice fishing experience. Accordingly, the device allows users to ice fish in a hands free manner without missing any opportunities to catch fish. Additionally, the device enables users to increase their opportunities to catch fish by multiplying the number of fishing poles/rods that can be 'manned' simultaneously.

In this manner, the ice fishing pole device of the present invention accomplishes all of the foregoing objectives and provides users with a fishing pole holding device that is specifically designed for ice fishing. The device is a fishing pole holder that secures ice fishing poles in a stable and upright position for extended periods of time.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an ice fishing pole/rod holding device. The device is a mount that holds an ice fishing pole in a stable and upright position. The ice fishing pole/rod holding device comprises a spiraled portion, a flat portion, and a stake. Once the stake is inserted into the ice and the flat portion is hooked onto it, a fishing pole can be inserted into the spiraled portion. Thus, the fishing pole is secured in an upright position and can remain as such (i.e., hands free) for an extended period of time, improving the overall ice fishing experience.

In one embodiment, the ice fishing pole/rod holding device of the present invention assists in any setting in which fishing is performed for an extended period of time. The device holds a casted fishing pole in a stable upright position. Accordingly, the device allows users to ice fish in a hands free manner without missing any opportunities to catch fish.

In one embodiment, the ice fishing pole/rod holding device comprises a spiraled portion. The spiraled portion is typically configured in a helical shape but can be configured in any suitable shape as is known in the art. Typically, the spiraled component comprises a glow in the dark coating for easy visibility in low light condition and a fastener that secures the spiraled portion to a flat portion.

In one embodiment, the fastener that attaches the spiraled portion to the flat portion is a threaded male and female fastener, although any fastener known in the art that is deemed suitable for the purpose described may be used.

In one embodiment, the flat portion is generally rectangular, with a thin side profile that bends (i.e., flexes) into a shape resembling an inverted letter U. In one embodiment, the inner surface of a curve found on the flat portion of the device supports the handle of the stake and the outer surface of one side supports the reel of a fishing pole.

In one embodiment, the stake is threaded to provide a stable support for the ice fishing pole/rod holding device and features a handle that is shaped as a rectangle with rounded corners. Hooks at the bottom of the flat portion of the device anchor to the stake handle.

In one embodiment, the ice fishing pole/rod holding device in accordance with the present invention can be produced in various colors, designs, patterns, etc., and feature logos, emblems, and or designs, such as a retailer and/or a user desires.

In one embodiment, the ice fishing pole/rod holding device is manufactured of steel, or any other suitable materials as is known in the art. Any number of different types of materials can be used to make the ice fishing pole/rod holding device including, but not limited to, other metals, plastics, polymers, carbon fiber, etc.

In use, the user inserts the stake into the ice. Then, the user anchors the flat portion of the device to the handle of the stake. Further, the user casts the desired fishing pole down into the water through the ice fishing hole. After the fishing pole is cast, the user secures the fishing pole by inserting it into the spiraled portion of the device. Finally, the user can utilize the device while ice fishing in a hands free manner, greatly improving the overall fishing experience.

It will also be appreciated that there are a number of additional add-on features that can be incorporated into the device and moreover, the ice fishing pole/rod holding device can take many different forms as is known in the art.

In yet another embodiment, the ice fishing pole/rod holding device comprises a plurality of indicia.

In yet another embodiment, a method of conveniently retaining a fishing pole in an upright position using the ice fishing pole/rod holding device is disclosed. The method includes the steps of providing an ice fishing pole/rod holding device comprising a spiraled portion, a flat portion, and a stake. The method also comprises inserting the stake into the ice. Further, the method comprises attaching the flat portion of the device to the stake. Further, the method comprises casting the desired fishing pole down into the water through the ice fishing hole. Additionally, the method comprises securing the fishing pole by inserting it into the spiraled portion of the device. Finally, the method comprises utilizing the device while ice fishing in a hands free manner.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
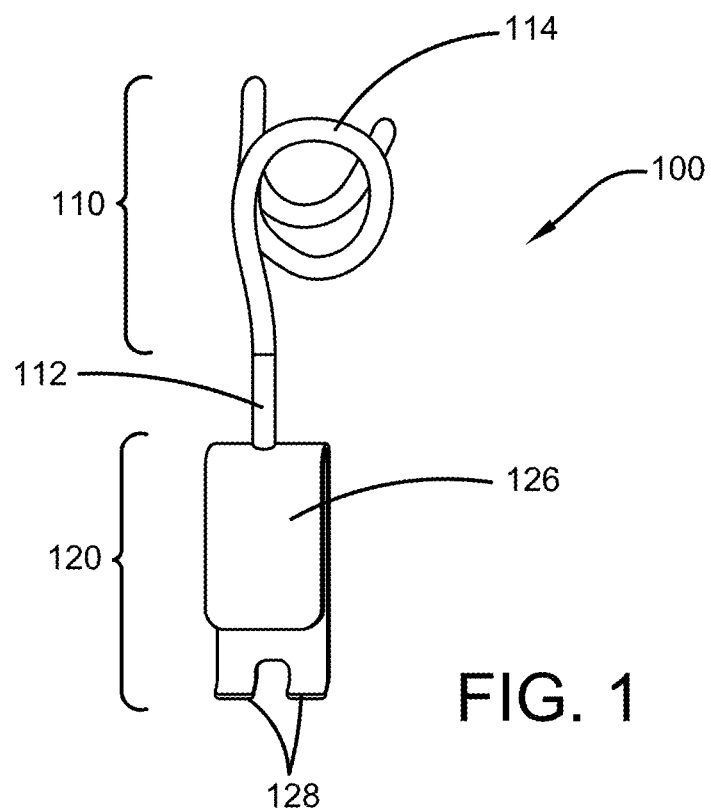
FIG. 1 illustrates a perspective view of one embodiment of the ice fishing pole/rod holding device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an ice fishing pole/rod holding device that provides users the ability to secure their pole after casting in order to take a break or perform other tasks. There is also a long-felt need in the art for an ice fishing pole/rod holding device that prevents the pulling of a pole under the ice while fishing. Finally, there is a long-felt need in the art for a fishing pole holding device that is effective in ice fishing settings. Further, there is a long-felt need for a device to enable a fisherman to 'man' several fishing poles simultaneously.

The present invention, in one exemplary embodiment, is a novel ice fishing pole/rod holding device for holding ice fishing poles in an upright position for extended periods of time while ice fishing. The ice fishing pole/rod holding device comprises a spiraled portion that is configured in a helical shape in which the handle of an ice fishing pole can be inserted. In one embodiment, the spiraled portion of the device is coated with a material that glows in the dark for better visibility in low light conditions. Attached to the spiraled portion is a flat portion via a fastener. The flat portion of the device both supports the reel of a fishing pole and anchors onto a stake placed in the ice. In one embodiment, the stake is threaded to provide a stable support for the ice fishing pole/rod holding device and features a handle that is generally rectangular with rounded corners. Hooks at the bottom of the flat portion of the device anchor to the stake handle. Thus, once the stake is inserted and the flat portion is hooked onto it with a fishing pole inserted into the spiraled portion, the fishing pole is secured in an upright position and can remain as such (i.e., hands free) for an extended period of time, improving the overall ice fishing experience.

The present invention includes a novel method of conveniently retaining a fishing pole in an upright position using the ice fishing pole/rod holding device. The method includes the steps of providing an ice fishing pole/rod holding device comprising a spiraled portion, a flat portion, and a stake. The method also comprises inserting the stake into the ice. Further, the method comprises attaching the flat portion of the device to the stake. Further, the method comprises casting the desired fishing pole down into the water through the ice fishing hole. Additionally, the method comprises securing the fishing pole by inserting it into the spiraled portion of the device. Finally, the method comprises utilizing multiple devices while ice fishing all in a hands free manner.

Referring initially to the drawings, FIG. 1 illustrates a perspective view of one embodiment of the ice fishing pole/rod holding device 100 of the present invention. In the present embodiment, the ice fishing pole/rod holding device 100 is an improved ice fishing pole/rod holding device 100 that provides a user with a mount for holding their fishing pole while ice fishing. Specifically, the ice fishing pole/rod holding device 100 comprises a spiraled portion 110 that is configured in a helical shape in which the handle of an ice fishing pole can be inserted. In one embodiment, the spiraled portion 110 of the device 100 features a glow in the dark coating 114 for better visibility in low light conditions.

Attached to the spiraled portion 110 is a flat portion 120 via a fastener 112. The flat portion 120 of the device 100 both supports the reel of a fishing pole and anchors onto a stake 130 placed into (i.e., inserted) the ice. In one embodiment, the stake 130 features threading 134 to provide a stable support for the ice fishing pole/rod holding device 100 and features a handle 132 that is shaped as a rectangle with rounded corners. Hooks 128 at the bottom of the flat portion 120 of the device 100 anchor to the stake handle 132. Thus, once the stake 130 is inserted and the flat portion 120 is hooked onto it with a fishing pole inserted into the spiraled portion 110, the fishing pole is secured in an upright position and can remain as such (i.e., hands free) for an extended period of time.

Figure 2:
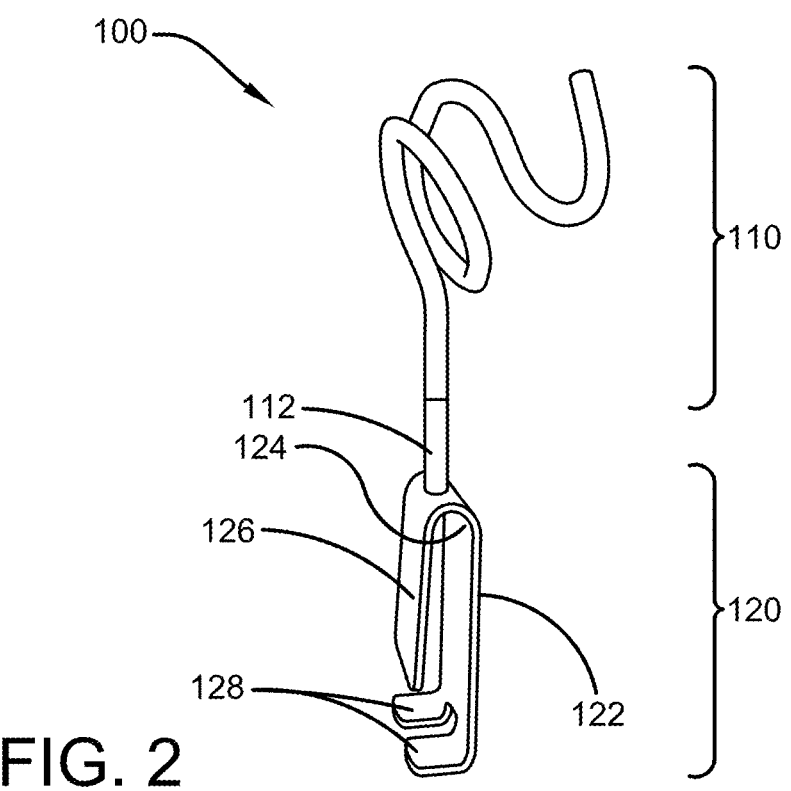
FIG. 2 illustrates a perspective view of one embodiment of the ice fishing pole/rod holding device of the present invention, showing the side of the device in accordance with the disclosed architecture.

As shown in FIG. 2, the ice fishing pole/rod holding device 100 comprises a flat portion 120. The flat portion 120 is generally rectangular, with a thin side profile that bends (i.e., flexes) into a shape resembling an inverted letter U. The flat portion 120 features a stake supporting surface 124, a reel supporting surface 122, and a back surface 126. The stake supporting surface 124 is defined by the inner surface of the curve found on the flat portion 120. The reel supporting surface 122 is defined by the surface facing the fishing hole during use. The reel of a fishing rod may rest against this reel supporting surface 122 for added stability. The back surface 126 is defined as the surface completely opposite the reel supporting surface 122. The back surface 126 faces the user during use.

Figure 3:
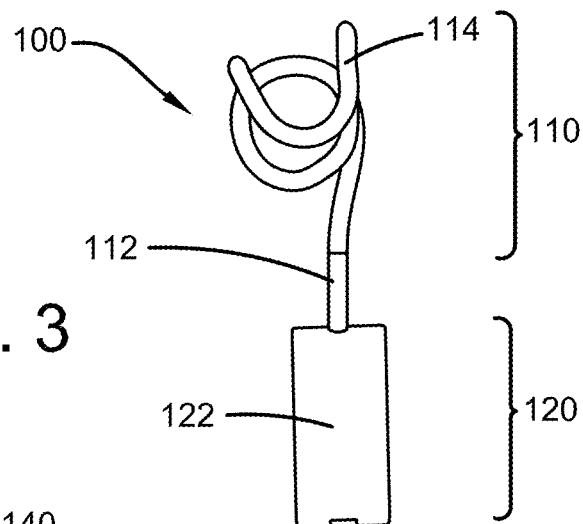
FIG. 3 illustrates a perspective view of one embodiment of the ice fishing pole/rod holding device of the present invention showing the reel supporting surface of the device in accordance with the disclosed architecture.

Shown in FIG. 3 is the ice fishing pole/rod holding device 100 of the present invention with the reel supporting surface 122 facing the viewer.

Figure 4:
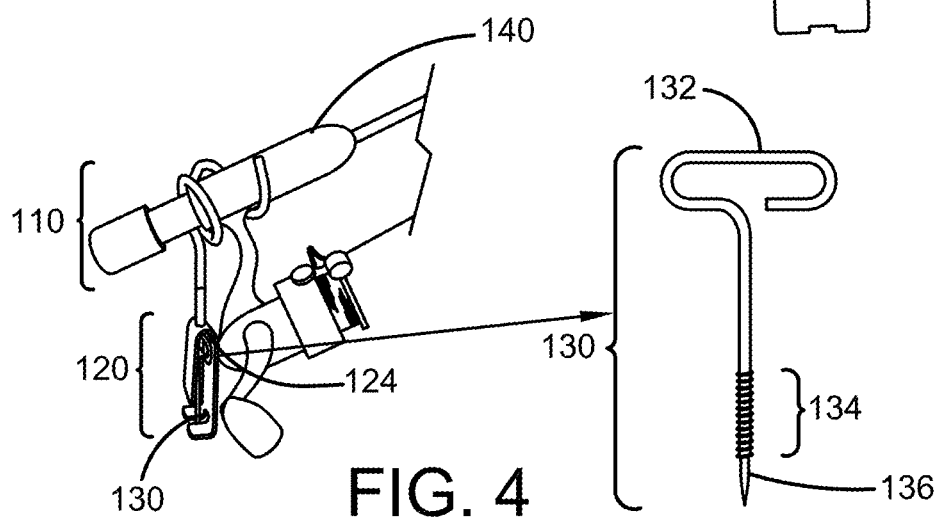
FIG. 4 illustrates a perspective view of one embodiment of the ice fishing pole/rod holding device of the present invention showing the device holding an ice fishing pole as well as an expanded view of the stake in accordance with the disclosed architecture.

Shown in FIG. 4 is the ice fishing pole/rod holding device 100 of the present invention being used to hold a fishing pole 140. In one embodiment, the spiraled portion 110 is large enough in diameter to accommodate any standard fishing pole handle. Also shown in FIG. 4, is an expanded view of the stake 130, and its handle 132, threading 134, and tip 136.

Figure 5:
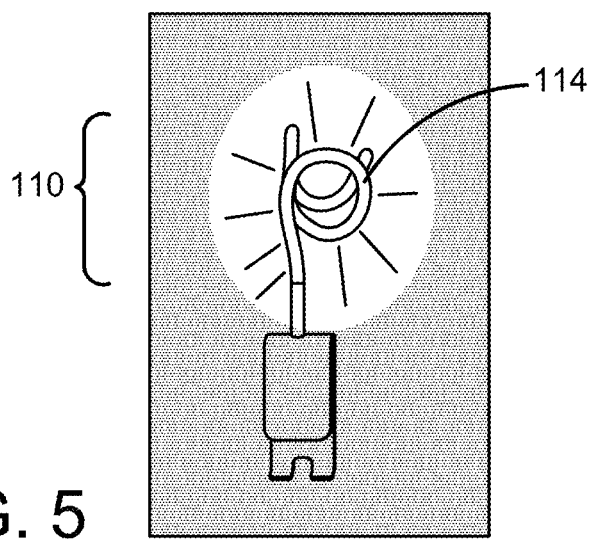
FIG. 5 illustrates a perspective view of one embodiment of the ice fishing pole/rod holding device of the present invention showing the glow in the dark rubber coating on the spiraled portion of the device in low light conditions in accordance with the disclosed architecture.

Shown in FIG. 5 is the coating 114 of the spiraled portion 110. In one embodiment, the coating 114 is comprised of a glow in the dark material to provide visibility of the device 100 in low light conditions. Additionally, in one embodiment, the coating 114 is comprised of rubber, plastic, polymer, silicone, et. al. although any material known in the art deemed suitable for the purpose described may be used.

In one embodiment, the ice fishing pole/rod holding device 100 is manufactured of a lightweight but durable metal, or any other suitable materials as is known in the art. Any number of different types of materials can be used to make the ice fishing pole/rod holding device 100 including, but not limited to, aluminum, steel, heat-scalable plastic, or polymers, such as polypropylene or acrylonitrile-butadiene-styrene (ABS), or any other suitable material as is known in the art, such as, but not limited to, acrylic, polycarbonate, polyethylene, etc. Generally, the ice fishing pole/rod holding device 100 is also manufactured from a material that is water resistant or waterproof.

In yet another embodiment, the ice fishing pole/rod holding device 100 comprises a plurality of indicia. The flat portion 120 of the device 100 may include advertising, a trademark, or other letters, designs, or characters, printed, painted, stamped, or integrated into the body component 120, or any other indicia as is known in the art. Specifically, any suitable indicia as is known in the art can be included, such as, but not limited to, patterns, logos, emblems, images, symbols, designs, letters, words, characters, animals, advertisements, brands, etc., that may or may not be ice fishing, fish, or brand related.

It will also be appreciated that there are a number of additional add-on features that can be incorporated into the device 100 and moreover, the ice fishing pole/rod holding device 100 can take many different forms as is known in the art.

Figure 6:
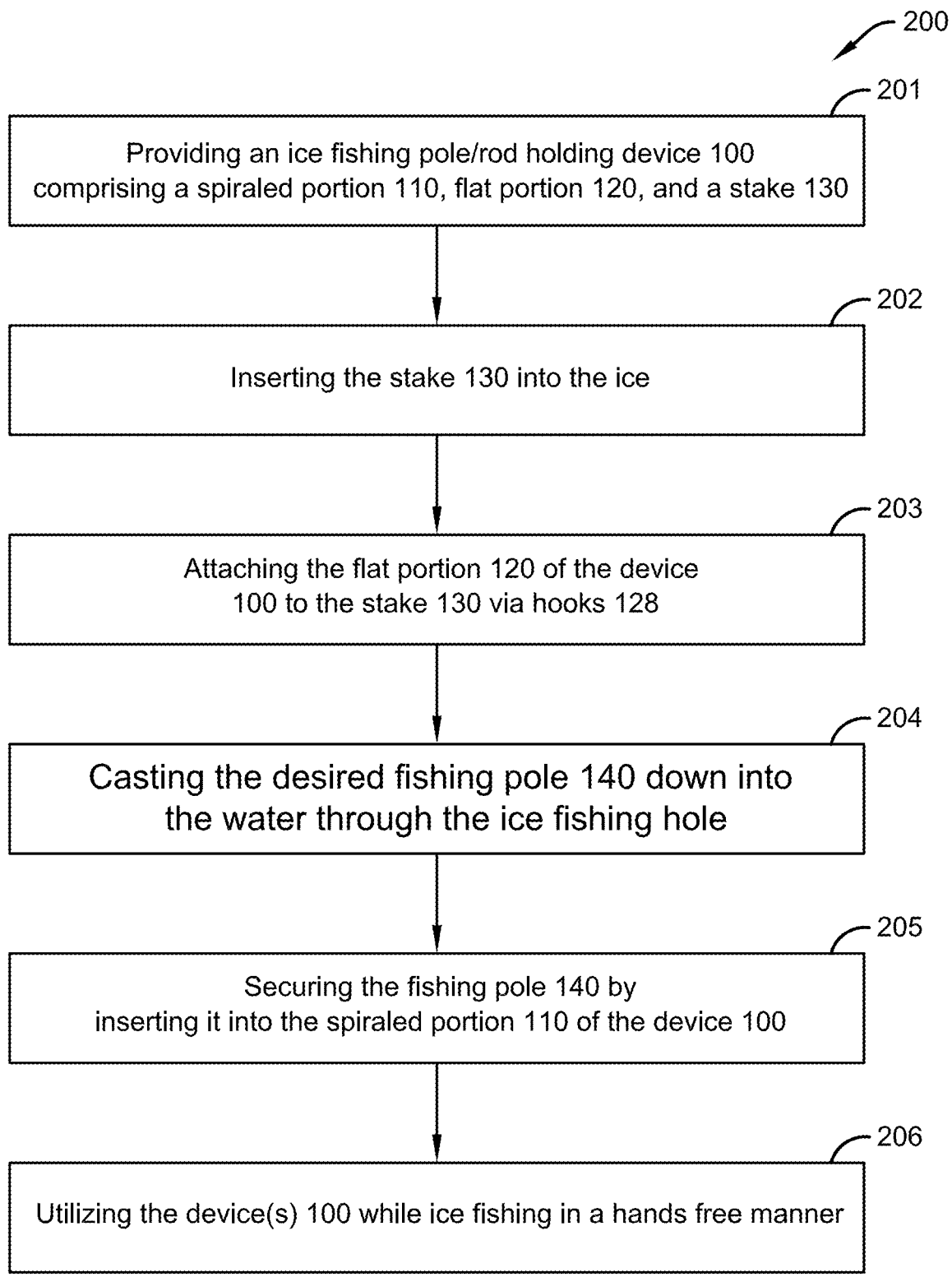
FIG. 6 illustrates a flowchart showing the method of conveniently retaining a fishing pole in an upright position using the ice fishing pole/rod holding device in accordance with the disclosed architecture.

FIG. 6 illustrates a flowchart showing a method 200 of conveniently retaining a fishing pole in an upright position using the ice fishing pole/rod holding device 100 is disclosed. The method 200 includes the steps of, at 201, providing an ice fishing pole/rod holding device 100 comprising a spiraled portion 110, flat portion 120, and a stake 130. The method 200 also comprises at 202 inserting the stake 130 into the ice. Further, the method 200 comprises at 203 attaching the flat portion 120 of the device 100 to the stake 130 via hooks 128. Further, the method 200 comprises at 204 casting the desired fishing pole 140 down into the water through the ice fishing hole. Additionally, the method 200 comprises at 205 securing the fishing pole 140 by inserting it into the spiraled portion 110 of the device 100. Finally, the method 200 comprises at 206 utilizing the device(s) 100 while ice fishing in a hands free manner.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "ice fishing pole/rod holding device", "fishing pole holding device", "ice fishing device", and "device" are interchangeable and refer to the ice fishing pole/rod holding device 100 of the present invention.

Notwithstanding the foregoing, the ice fishing pole/rod holding device 100 of the present invention can be of any suitable size and configuration as is known in the art without affecting the overall concept of the invention, provided that it accomplishes the above-stated objectives. One of ordinary skill in the art will appreciate that the ice fishing pole/rod holding device 100 as shown in FIGS. 1-6 is for illustrative purposes only, and that many other sizes and shapes of the ice fishing pole/rod holding device 100 are well within the scope of the present disclosure. Although the dimensions of the ice fishing pole/rod holding device 100 are important design parameters for user convenience, the ice fishing pole/rod holding device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An ice fishing rod holding device comprising:
   a spiraled portion;
   a flat portion;
   a stake;
   a handle; and
   a reel supporting surface;
   wherein said spiraled portion having a helical shape for holding a handle of the ice fishing rod within said spiraled portion;
   wherein said spiraled portion connected to said flat portion with a fastener;
   wherein said flat portion anchors to said handle of said stake;
   wherein said reel supporting surface supports a reel of the ice fishing rod;
   wherein said stake is a threaded stake;
   wherein said handle having a rectangular shape with rounded corners;
   wherein said flat portion having a plurality of hooks at a bottom terminal end for anchoring to said handle of said stake; and
   further wherein said stake inserted into a quantity of ice when the ice fishing rod holding device is in use.

2. The ice fishing rod holding device of claim 1, wherein said spiraled portion having a glow in the dark coating.

3. The ice fishing rod holding device of claim 2, wherein said glow in the dark coating having a material selected from the group consisting of a rubber, a plastic, a polymer, and a silicone.

4. The ice fishing rod holding device of claim 1, wherein said flat portion is rectilinear.

5. The ice fishing rod holding device of claim 1, wherein said flat portion comprising a flexible material.

6. The ice fishing rod holding device of claim 5, wherein said flat portion having said reel supporting surface.

7. A fishing rod holding device comprising:
   a spiraled portion;
   a flat portion;
   a stake;
   a handle; and
   a reel supporting surface;
   wherein said spiraled portion having a helical shape for holding a handle of the fishing rod within said spiraled portion;
   wherein said spiraled portion connected to said flat portion with a fastener;
   wherein said flat portion anchors to said handle of said stake;
   wherein said reel supporting surface supports a reel of the fishing rod;
   wherein said stake inserted into a ground surface when the fishing rod holding device is in use;
   wherein said flat portion comprising a flexible material;
   wherein said flat portion having a plurality of hooks at a bottom terminal end for anchoring to said handle of said stake; and
   further wherein said flat portion having said reel supporting surface for supporting a reel of the fishing rod.

8. The fishing rod holding device of claim 7, wherein said stake is a threaded stake.

9. The fishing rod holding device of claim 7, wherein said spiraled portion having a glow in the dark coating.

10. The fishing rod holding device of claim 9, wherein said glow in the dark coating having a material selected from the group consisting of a rubber, a plastic, a polymer, and a silicone.

11. The fishing rod holding device of claim 7, wherein said handle having a rectangular shape with rounded corners.

12. The fishing rod holding device of claim 7, wherein said flat portion is rectilinear.

13. A fishing rod holding device comprising:
   a spiraled portion;
   a flat portion;
   a stake;
   a handle; and
   a reel supporting surface;
   wherein said spiraled portion having a helical shape for holding a handle of the fishing rod within said spiraled portion;
   wherein said spiraled portion connected to said flat portion with a fastener;
   wherein said flat portion anchors to said handle of said stake;
   wherein said reel supporting surface supports a reel of the fishing rod;
   wherein said stake inserted into a ground surface when the fishing rod holding device is in use;
   wherein said flat portion comprising a flexible material;
   wherein said flat portion having said reel supporting surface for supporting a reel of the fishing rod;
   wherein said stake is a threaded stake;
   wherein said handle having a rectangular shape with rounded corners;

wherein said flat portion having a plurality of hooks at a bottom terminal end for anchoring to said handle of said stake; and further wherein said spiraled portion having a glow in the dark coating including a material selected from the group consisting of a rubber, a plastic, a polymer, and a silicone.

14. The fishing rod holding device of claim 13, wherein said flat portion is rectilinear.

\* \* \* \* \*